Jan. 7, 1958 J. K. BRIXIUS 2,818,937
FRAME FOR PANEL FILTER
Filed Jan. 5, 1955 2 Sheets-Sheet 1

INVENTOR.
JACOB K. BRIXIUS
BY
ATTORNEY

Jan. 7, 1958   J. K. BRIXIUS   2,818,937
FRAME FOR PANEL FILTER
Filed Jan. 5, 1955   2 Sheets-Sheet 2
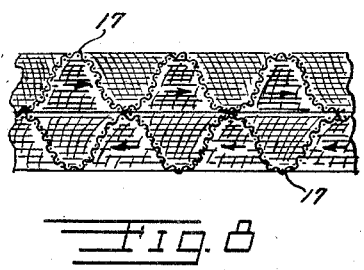
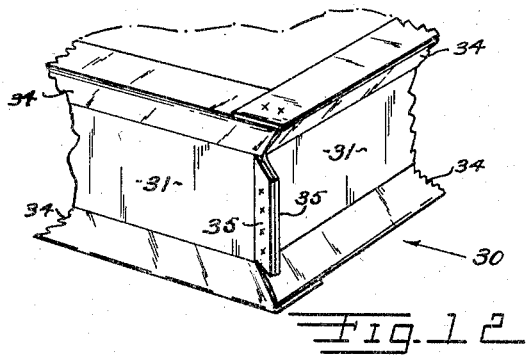
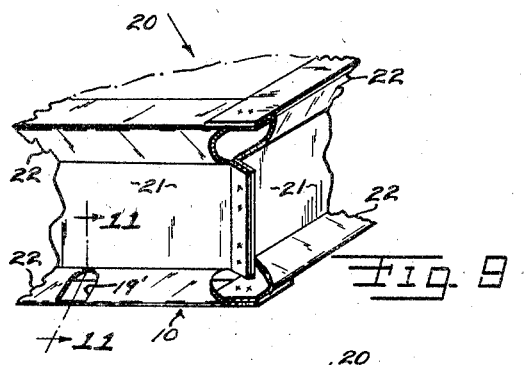
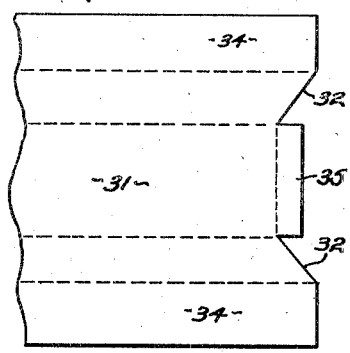
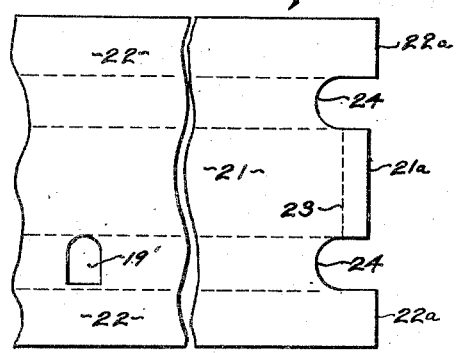
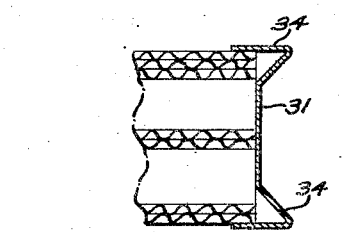
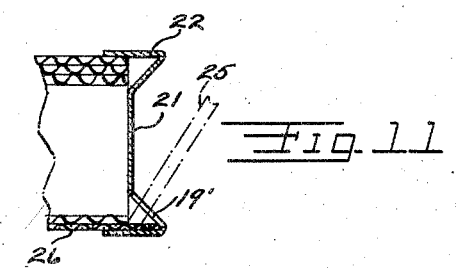
INVENTOR.
JACOB K. BRIXIUS
BY
Hyde, Meyer, Baldwin & Doran
ATTORNEYS

United States Patent Office 2,818,937
Patented Jan. 7, 1958

2,818,937
FRAME FOR PANEL FILTER

Jacob K. Brixius, Parma, Ohio, assignor to Air-Maze Corporation, Cleveland, Ohio, a corporation of Delaware Application January 5, 1955, Serial No. 479,880

2 Claims. (Cl. 183—69)

This invention relates to improvements in a frame for an air filter or the like.

An object of my invention is to provide a filter frame that may be punched from sheet material in the form of a plurality of separate sides which are securely locked together for enclosing filter material of various types.

Another object of my invention is to provide a filter frame having the above characteristics, wherein the sides are interlocked by simple means requiring no screws, bolts or rivets.

A further object of this invention is to provide a filter frame structure which may be formed and assembled by a simple and inexpensive stamping operation, thereby insuring rapid production, uniform size and shape, and easy assembly.

Another object of the present invention is to provide a filter frame characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 8 is an enlarged fragmental view taken along the plane of line 8—8 of Fig. 7;

Fig. 9 is an enlarged perspective view of a corner of my novel frame device illustrating modified means for connecting the side members together at their corner junctions;

Fig. 10 is an enlarged fragmental plan view of a blank of sheet material from which the device illustrated in Fig. 9 is constructed;

Fig. 11 is an enlarged fragmental sectional view taken along the plane of line 11—11 in Fig. 9, and illustrating how an electrode may be inserted into the frame members for purposes of welding the various side members together;

Fig. 12 is a perspective view of another embodiment of my invention illustrating a modified means for connecting the side members together at their corner junction;

Fig. 13 is an enlarged fragmental plan view of a blank of sheet material from which the device illustrated in Fig. 12 is constructed;

Fig. 14 is a fragmental sectional view of my novel frame illustrating a modified embodiment wherein no face screen or flattened metal grill is used for retaining the filter material within the frame.

Figure 2:
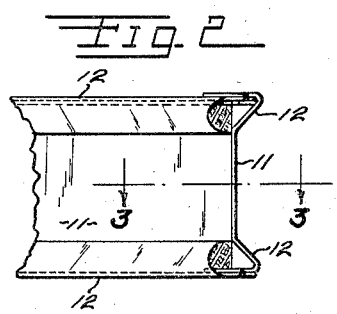
Fig. 2 is an enlarged fragmental view taken along the plane of line 2—2 of Fig. 1.
Figure 3:
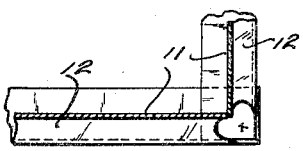
Fig. 3 is an enlarged fragmental sectional view taken along the plane of line 3—3 of Fig. 2.

The present invention provides a strong frame for an air filter or the like and one which is formed from a plurality of individual side members 10. The side members 10 are identical and may be stamped out of a sheet of material by a single die, as illustrated in Fig. 6. The blank shown in Fig. 6 relates to that embodiment of my invention shown in Figs. 1 through 6. The blank 10 is generally rectangular in form and has both ends constructed substantially identical to each other. In Fig. 6, I have shown only one end of such blank which includes an uninterrupted central web portion 11. Along each side of the central web portion 11 are wide strip portions 12 which are intended to be folded along the lines 13 and 14 to provide a frame generally channel-formed in section, as shown in Figs. 2 and 3. The web of the channel being provided by the uninterrupted central strip portion 10 and the portions 12 provide the upper and lower edge flanges which extend substantially transverse to the web.

Referring again to Fig. 6, the side strip portions 12 have portions 12a which extend beyond the distal end of the central web portion 11 to provide overlapping portions or ears wherever a corner of the frame is formed, as hereinafter described. Between the extended portions 12a and the central web portion 11, the side strip is provided with semi-circular notches 12b which extend inwardly from the distal end of the central web portion 11, in a manner to separate the distal ends of the central web 11 and the side strips 12.

Figure 5:
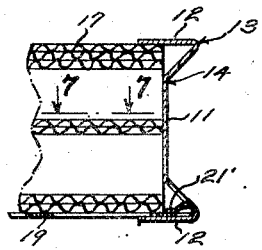
Fig. 5 is an enlarged fragmental sectional view taken along the plane of line 5—5 of Fig. 4.
Figure 6:
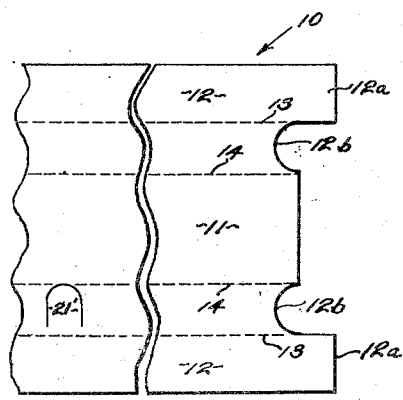
Fig. 6 is an enlarged fragmental plan view of a blank sheet of material from which the device illustrated in Figs. 1 through 5 is constructed.

The blank of Fig. 6 is first folded outwardly along lines 14 at approximately 45° to the plane of the central web, as seen in Figs. 2 and 5. Each side strip 12 is then folded 135° inwardly intermediate its edges along the line 13 to form the flanges of the frame at either edge of the web portion 11, as seen in Figs. 2 and 5. Or in other words the blank is folded outwardly along line 14 at approximately 45° to the web and then inwardly beyond the plane of the web at approximately right angles to the plane of the web. The inwardly extending portions of the flanges provide means for retaining the filter material in said frame. The flanges 12 in effect form a pair of hollow ribs or channels at each edge of the web and thereby add greatly to the structural rigidity of the framework.

Figure 1:
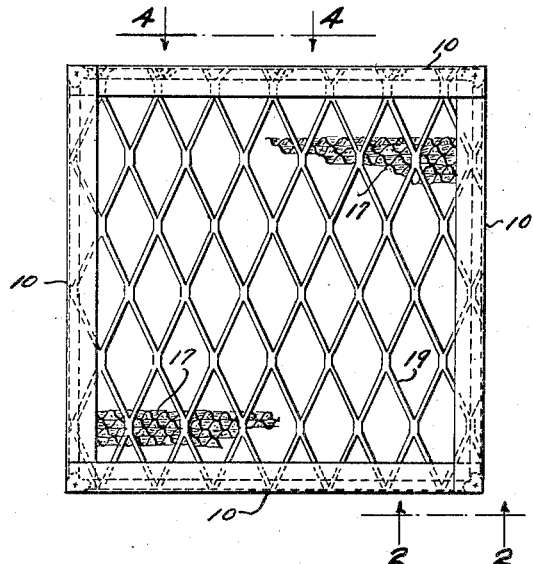
Fig. 1 is a top plan view of an assembled filter frame embodying my invention.

The four individual side members 10, as indicated in Fig. 1, are then brought together to form corner junctions defined by the intersections of the distal ends of the webs 11, of adjacent side members. The junction of the distal ends of the webs 11 are substantially coplanar with their respective webs, as best seen in Figs. 2 and 3. It will be noted that when the side members are formed as above described, the overhanging portions or ears 12a of the side strip portions 12 overlap each other at the corner junctions of the frame in an assembled condition, as clearly indicated in Figs. 1 and 3. It should be noted in Fig. 1 that the ears 12a at one end of each individual side member overlap those of the adjacent side member, while the ears at the other end of said side member are overlapped by its adjacent side member, thus allowing said individual side members to be constructed of substantially identical end shapes. The notches 12b of adjacent side members cooperate at the corner portions of the frame to form openings, as seen in Fig. 3, which facilitate securing the individual side members together by spot welding as shown in Fig. 11 or by other suitable means.

Figure 7:
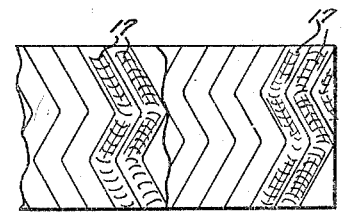
Fig. 7 is an enlarged fragmental sectional view taken along the plane of line 7—7 of Fig. 5 and showing a preferred type of filter material to be used in connection with the novel frame means.

The filter material within the frame forms no part of the present invention, although I have indicated in Figs. 7 and 8 a preferred type of filter material comprising a plurality of corrugated layers of paper or wire screen mesh material, one on top of another. Each layer of filter material is provided with a plurality of parallel zig-zag corrugations or crimps 17 of Z form. Preferably, adjacent layers are so arranged that adjacent corrugations cross each other as shown in the mid-portion of Fig. 7. With this type of filter material construction there is practically no tendency for the gaseous stream of air to flow directly through the Z-shape passageway between adjacent corrugations, but rather must intersect the side walls of the passageway, and create a turbulence in the stream as it passes through the filter and thereby increase filtering efficiency. The filtering material is usually coated with an adhesive material, such as oil which greatly aids the dust holding capacity of the filter.

Figure 4:
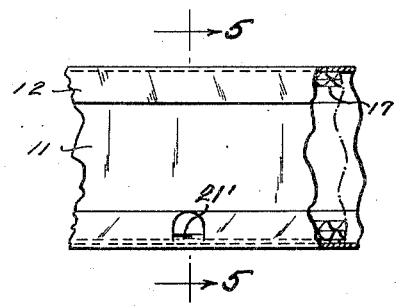
Fig. 4 is an enlarged fragmental view taken along the plane of line 4—4 of Fig. 1.

It will be noted that the web portions 11 of the frame completely encircle the filter material leaving the front and rear faces of the frame open for the passage therethrough of a stream of air or other gas to be filtered. The flange portions extending inwardly of the plane of the web portion 11 overlap the two outer faces of the filter material and aid in retaining it within the filter frame. The open faces of the frame may be provided with a flattened expanded-metal retaining grill 19 whose outermost edges extend into the hollow interior of the channel shaped flanges 12 and which may be firmly retained therein by suitable tongues 21' struck out of the material of the flanges 12 as seen in Figs. 4, 5 and 6, and bent inwardly to engage the metal retaining grill 19. As seen in Fig. 5, the outermost extent of the filter material is flush with the inner surface of the web portion 11, and does not extend outwardly into the hollow of the flanges 12, thereby providing a substantial saving in filter material.

Obviously, the frame could be formed from a single blank of sheet material in which the web portions of all four sides of the frame form an uninterrupted central strip adapted for later bending along a line which presently marks the distal end of the web portions 11, as seen in Fig. 10. The side strip portion would also have to be interrupted wherever a corner of the frame is to be formed. This could be done by removing a portion entirely or by merely cutting a slot in the side strip portions 12. I prefer, however, the device as shown in Fig. 1 made out of individual side members.

In Figs. 9 through 11, I have shown another embodiment of my invention illustrating a modified corner construction for the frame. It should be understood that the frame in this embodiment is identical to that heretofore shown in Figs. 1 through 6, including individual side members 20 comprising a web portion 21 having a pair of flanges 22 at its upper and lower edges, constructed from a blank 20 in the identical manner as heretofore described. The embodiment shown in Fig. 9 is identical to that shown in Figs. 1 through 6 except for the tongues 21a which are provided by extending the distal end of the central web portion 21 outwardly, as seen in Fig. 10. These tongues are bent outwardly substantially along line 23 so that an angle of approximately 45° is formed with the plane of the respective web portions 21. Also the lower flange member 22 is provided with a cut-out 19' to facilitate welding the component parts together. The individual side members are brought together in the identical manner as heretofore described, so that the tongues 21a of the respective side members forming the corner, as viewed in Fig. 9, abut one another over substantially their entire surface area. Since the tongues 21a project outwardly from the corners of the frame, it is an easy matter to spot weld them together. A welding rod or electrode 25, as viewed in Fig. 11, may be introduced through the corner openings which are formed in the identical manner as heretofore described, in Figs. 2 and 3, to rigidly secure the respective side members together utilizing tongues 22a analogous to tongues 12a. It should be noted that Fig. 11 illustrates the flattened expanded metal retaining grills 26 which cover the front and rear faces of the frame and aid in retaining the filter material therein. They extend outwardly into the hollow channels of the flange members 22, and are spot welded in place by introducing an electrode 25 through the cut-outs 19'. The grills 26 may also be secured by welding at the corners of the frame through the corner openings.

The openings formed at the corners by cut-outs 24 provide drain openings for removing excess oil where the filter is so coated.

Another embodiment of the present invention is shown in Figs. 12 to 14, this modification being identical in all respects to that shown in Figs. 9 to 11 with the exception that the openings provided at the corner junction of the embodiment shown in Fig. 9 have been omitted; and the material brought together to form a completely closed junction at the corners of the frame. The frame members forming the corners, as seen in Fig. 12, are identical to those shown in Fig. 9 and include individual side members 30, having a central web portion 31, each side member being channel-shaped in section with the web of the channel forming a portion of the outer periphery of the frame and the two flanges of the channel formed at the outer edges of the web retaining the filter material and adding to the structural rigidity of the frame member. The blank shown in Fig. 13 is identical to that shown in Fig. 10 with the exception of notches 24 which have been omitted. The side strip portions extend outwardly to form an outer edge which extends along a diagonal line 32. When two individual side members 30 are brought together, as indicated in Fig. 12, a completely closed junction is formed at the corners by the overlapping of the upper and lower flange portions 34, the contacting and abutting relationship of the diagonal edges 32 and the mating engagement of the surfaces of outstanding tongues 35. The tongues 35 are welded together as shown. The flanges 34 may or may not be welded together at the corners, as desired.

In Fig. 14 I have shown a fragmental cross sectional view of a filter frame and filter material which is identical to that of Fig. 5 with the one exception of having the flattened expanded metal retaining grill removed. Here the filter material is shown supported directly by the filter frame without the aid of the face screen.

It will be understood, of course, that the filter frame illustrated in Figs. 9 and 12 can also be formed of a single blank of sheet material as heretofore described with respect to Figs. 1 through 6.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible of certain changes fully comprehended by the spirit of the invention.

What I claim is:

1. A frame for supporting filter material having a plurality of sides connected together forming a closed frame, each side being channel-shape in section with the web of the channel forming a portion of the outer periphery of the frame and the two flanges of the channel forming a pair of hollow ribs at each edge of said web, said flanges extending outwardly beyond the plane of said web at other than right angles to said web and then inwardly beyond the plane of said web at approximately right angles to the plane of said web for retaining the filter material in said frame, said web being severed from said flanges at the frame corners, said web at each corner having portions bent outwardly, said outwardly bent web portions of adjacent sides abutting each other, said flanges of adjacent sides overlapping at each corner, and means securing said abutting webs together.

2. A generally rectangular frame for supporting filter material, said frame made of a plurality of side members connected together, each side being channel-shape in section having a web and two edge flanges, said flanges at each edge of said web extending outwardly beyond the plane of said web at an angle less than ninety degrees from said web and then inwardly beyond the plane of said web at approximately right angles to the plane of said web to form a pair of reinforcing channels at each edge of said web, said flanges having portions entirely cut away at said corners, said web being severed from said flanges at the frame corners, said web at the frame corners being bent outwardly at approximately forty-five degrees, said outwardly bent web portions of adjacent sides abutting each other, said flanges of adjacent sides overlapping at each corner, and means securing said overlapping flanges and abutting webs respectively together.

References Cited in the file of this patent

UNITED STATES PATENTS

| | | |
|---|---|---|
| 1,598,097 | Mathis | Aug. 31, 1926 |
| 2,393,419 | Schaaf | Jan. 22, 1946 |
| 2,675,887 | Gonzalez | Apr. 20, 1954 |
| 2,677,436 | Mazek | May 4, 1954 |